April 20, 1948.　　　G. E. CASSIDY　　　2,440,076

ENGINE TEST SYSTEM

Filed Dec. 22, 1944

Inventor
George E. Cassidy,
by Harry E. Dunham
His Attorney.

Patented Apr. 20, 1948

2,440,076

UNITED STATES PATENT OFFICE 2,440,076

ENGINE TEST SYSTEM

George E. Cassidy, Alplaus, N. Y., assignor to General Electric Company, a corporation of New York Application December 22, 1944, Serial No. 569,336

9 Claims. (Cl. 318—148)

My invention relates to engine test systems and particularly to a variable speed system for testing a source of mechanical power.

An object of my invention is to provide an improved electrical system of the variable speed type for testing a source of mechanical power.

Another object of my invention is to provide an improved variable speed electrical system for connecting together a source of mechanical power and an alternating current source of electric power.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
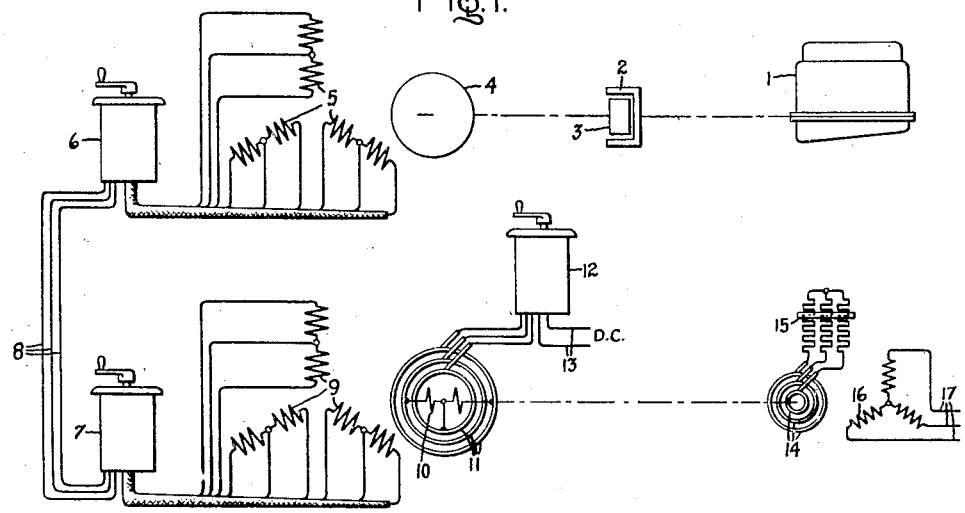
Figure 2:
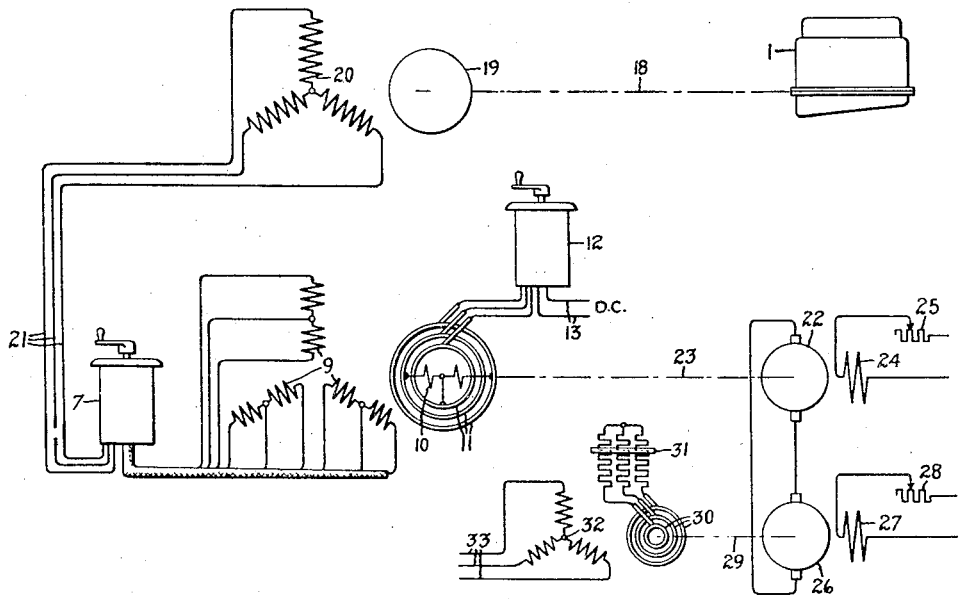

In the drawing, Fig. 1 is a schematic illustration of an electrical test system embodying my invention; and Fig. 2 is a schematic illustration of another embodiment of my improved variable speed electrical system.

In variable speed electrical systems for driving equipment, such as an engine which is tested from the standpoint of the power required to drive the engine from an external source in order to measure its mechanical losses and to "break in" the engine prior to its application to a desired driven load, it is necessary to have a system in which the speed is adjustable over a relatively wide range. If this adjustable speed feature is placed entirely in the connection between the engine and the final driving motor or driven generator, it is necessary to provide a relatively large capacity coupling which also entails a large amount of losses and control equipment and provides a relatively uneconomical and inefficient system. In this type system, the engine also is often operated as a source of mechanical power, and the mechanical power may be used as a driving means for a generator which can regenerate this power as electrical energy and return it into a power system, thus providing a very economical testing set.

Referring to the drawing, I have shown in Fig. 1 an embodiment of my improved variable speed electric system for testing a source of mechanical power, such as an engine 1 which is mechanically connected to one element 2 of a conventional inductor type slip clutch or coupling, of which the other rotatable member 3 is mechanically connected to the rotatable member 4 of an alternating current dynamoelectric machine which may be operated as a motor or a generator, depending upon whether the engine is driven by the rotatable member 4 or supplies mechanical power for driving the member 4. The stationary member of the dynamoelectric machine of the rotatable member 4 is provided with a multipolar alternating current three-phase winding 5 formed with connections in each of the phases which may be used to change the number of poles of the machine by operation of a pole changing stator controller 6 which is electrically connected to another stator pole changing controller 7 by suitable electrical connections 8. This second pole changing controller 7 is connected to a second multipolar alternating current winding 9 on the stator of a second dynamoelectric machine of the alternating current type provided with a rotatable member having a direct current field exciting winding 10 to which direct current is adapted to be supplied through slip rings 11 connected to a pole changing field controller 12 for varying the number of poles of the rotatable member of the machine and for energizing the field exciting winding 10 from a suitable source of direct current 13. In this manner, the frequency and speed of the rotatable member 4 of the first dynamoelectric machine may be changed by changing the number of poles provided by the stator winding 5, and this change in number of poles will affect the current supplied to the stator winding 9 of the second dynamoelectric machine when the first dynamoelectric machine operates as a generator and will provide a corresponding variation in the speed of this second machine. Similarly, the speed and frequency of the current of the second dynamoelectric machine may be varied by varying the stator winding poles by the controller 7, such that for a given frequency supplied to the stator winding 9 of the second dynamoelectric machine, the speed of this machine may be varied by varying the number of poles of this stator winding, or if this machine operates as a generator, the frequency supplied by this machine to the first dynamoelectric machine alternating current winding 5 may be varied by varying the number of poles of the stator winding 9, thereby varying the speed of the first-mentioned dynamoelectric machine correspondingly. In addition, by varying the number of poles of the rotatable member winding 10, the speed of this second dynamoelectric machine may be further varied correspondingly if the machine is operating as a motor, or the frequency of the machine may be varied correspondingly if the machine is operating as a generator. Thus, the range of frequencies and speed is greatly increased in this system without requiring the slip coupling 2—3 to absorb any large amount of power.

The rotatable member of the second dynamoelectric machine is mechanically connected to the rotatable member of another dynamoelectric machine for transmitting mechanical power therebetween, and this other machine may be of the induction type including a wound rotor connected to slip rings 14 which are connected together through a suitable external variable resistor 15 for controlling the speed of this machine. This third dynamoelectric machine is provided with a stator winding 16 which is connected to a suitable source of alternating current electrical power 17, which is adapted to supply power to the third machine if this machine is operated as a motor and to which power is adapted to be supplied if this third dynamoelectric machine is operated as an induction generator. Thus, it is seen that with this system, power may be transmitted from the third dynamoelectric machine through the electrical system and the various couplings to the source of mechanical power which is being tested, or power may be transmitted from the source of mechanical power through the electrical system, to the source of electrical power 17 and provides a very wide range of speed control without the use of an oversized slip coupling and without the use of complicated control devices, thereby providing an economical control over the speed of the system with efficient and simple operation.

In Fig. 2, I have shown another embodiment of my invention in which corresponding parts have been given the same reference numerals as in Fig. 1, in which a suitable source of mechanical power, such as an engine 1, is mechanically connected by a suitable coupling shaft connection 18 to a rotatable member 19 of an alternating current dynamoelectric machine provided with a three-phase stationary winding 20, which is connected by suitable electrical conductors 21 to a stator winding pole changing controller 7 which is arranged to control the number of poles of an alternating current stator winding 9 of a second alternating current dynamoelectric machine for controlling the frequency and speed of this second machine. This machine also is provided with a rotatable member having a direct current exciting winding 10 connected to slip rings 11 and to a suitable source of direct current electric power 13 through a pole changing controller 12 in the same manner as that shown in Fig. 1 for further controlling the speed and frequency of the second alternating current dynamoelectric machine. This second dynamoelectric machine is connected to the rotatable member of another alternating current dynamoelectric machine for transmitting mechanical power therebetween by a suitable controllable speed coupling formed by a motor-generator set including a third dynamoelectric machine having a rotatable member 22 mechanically connected by a suitable coupling shaft 23 to the rotatable member of the second alternating current dynamoelectric machine for transmitting mechanical power therebetween and provided with a field exciting winding 24 connected to a source of excitation through a variable resistor 25 for controlling the excitation of the field of this direct current dynamoelectric machine and thereby controlling the speed and voltage of the machine. The rotatable member 22 of this direct current dynamoelectric machine is electrically connected to a rotatable member 26 of a second direct current dynamoelectric machine for transmitting electrical power therebetween, and this second machine is provided with a field exciting winding 27 connected to a suitable source of direct current through a variable resistor 28 for controlling the energization of the field of this machine, and thereby controlling the speed and voltage thereof. The rotatable member 26 is mechanically connected by a suitable coupling shaft 29 to the rotatable member of a third alternating current dynamoelectric machine provided with a winding connected to slip rings 30 and to a variable three-phase external resistor 31. This third alternating current dynamoelectric machine is of the wound rotor induction type, and the variable resistor 31 is adapted to control the speed of this machine in the same manner as that in Fig. 1. The machine is provided with a stator having an alternating current winding 32 connected to a suitable source three-phase alternating current power 33 for transmitting electrical power between the source of alternating current and the third alternating current dynamoelectric machine. In this arrangement, additional speed control is obtained by the use of the motor-generator set including the two direct current dynamoelectric machines provided as a variable speed coupling between the second and third alternating current dynamoelectric machines. Obviously, both of the systems shown in Figs. 1 and 2 may be provided with the slip clutch and with the pole changing controller for the stator winding of the first alternating current dynamoelectric machine, and similarly, both systems may also be provided with the variable speed coupling formed by the direct current dynamoelectric machine motor-generator set shown in Fig. 2. This provides a very simple and efficient variable speed electric system for testing purposes for both driving and loading the source of mechanical power. Such an electrical system may be found useful for controlling other types of variable speed equipment as well as for testing purposes.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A variable speed electric system including an alternating current dynamoelectric machine having an alternating current winding, means for transmitting power between said alternating current dynamoelectric machine and a source of mechanical power, a second alternating current dynamoelectric machine having an alternating current winding, means for changing the number of poles of said second alternating current dynamoelectric machine for controlling the frequency and speed thereof, means for electrically connecting said first-mentioned alternating current dynamoelectric machine alternating current winding to said second alternating current dynamoelectric machine alternating current winding for transmitting electrical power therebetween, a third dynamoelectric machine, means for transmitting mechanical power between said dynamoelectric machine and said third dynamoelectric machine, means for transferring power between said variable speed electrical system and an independent source of electrical power including means connecting said third dynamoelectric machine to such independent source of electrical power other than said first two-mentioned dynamoelectric machines.

2. A variable speed electric system including an alternating current dynamoelectric machine having an alternating current winding, means for transmitting power between a source of mechanical power and said alternating current dynamoelectric machine, a second alternating current dynamoelectric machine having an alternating current winding, means for changing the number of poles of said second alternating current dynamoelectric machine for controlling the frequency and speed thereof, means for electrically connecting said first-mentioned alternating current dynamoelectric machine alternating current winding to said second alternating current dynamoelectric machine alternating current winding for transmitting electrical power therebetween, a third alternating current dynamoelectric machine, means for connecting said third dynamoelectric machine to a source of electrical power, and means for transmitting mechanical power between said second dynamoelectric machine and said third dynamoelectric machine including a controllable speed and voltage direct current dynamoelectric machine electrically connected to a second controllable speed and voltage direct current dynamoelectric machine with means for mechanically connecting said second direct current dynamoelectric machine to said third alternating current dynamoelectric machine.

3. A variable speed electric system for testing a source of mechanical power including an alternating current dynamoelectric machine having an alternating current winding, means for transmitting power between said source of mechanical power and said alternating current dynamoelectric machine, a second variable frequency and speed alternating current dynamoelectric machine having an alternating current winding and a direct current exciting winding, means for changing the number of poles of said second alternating current dynamoelectric machine alternating current winding for controlling the frequency and speed thereof, means for changing the number of poles of said second alternating current dynamoelectric machine exciting winding for further controlling the frequency and speed thereof, means for electrically connecting said first-mentioned alternating current dynamoelectric machine alternating current winding to said second alternating current dynamoelectric machine alternating current winding for transmitting electrical power therebetween, a third dynamoelectric machine, means for transmitting mechanical power between said second dynamoelectric machine and said third dynamoelectric machine, means for transferring power between said variable speed electrical system and an independent source of electric power supply including means connecting said third dynamoelectric machine to such independent source of electrical power supply other than said first two-mentioned dynamoelectric machines.

4. A variable speed electric system for testing a source of mechanical power including a variable frequency and speed alternating current dynamoelectric machine having an alternating current winding, means for changing the number of poles of said alternating current dynamoelectric machine winding for controlling the frequency and speed thereof, means for transmitting power between said source of mechanical power and said alternating current dynamoelectric machine, a second variable frequency and speed alternating current dynamoelectric machine having an alternating current winding and a direct current exciting winding, means for changing the number of poles of said second alternating current dynamoelectric machine alternating current winding for controlling the frequency and speed thereof, means for changing the number of poles of said second alternating current dynamoelectric machine exciting winding for further controlling the frequency and speed thereof, means for electrically connecting said first-mentioned alternating current dynamoelectric machine alternating current winding to said second alternating current dynamoelectric machine alternating current winding for transmitting electrical power therebetween, a third dynamoelectric machine, means for connecting said third dynamoelectric machine to a source of electrical power, and means for transmitting mechanical power between said second dynamoelectric machine and said third dynamoelectric machine.

5. A variable speed electric system for testing a source of mechanical power including an alternating current dynamoelectric machine having an alternating current winding, means for transmitting power betwen said source of mechanical power and said alternating current dynamoelectric machine, a second alternating current dynamoelectric machine having an alternating current winding and a direct current exciting winding, means for changing the number of poles of said second alternating current dynamoelectric machine alternating current winding for controlling the frequency and speed thereof, means for changing the number of poles of said second alternating current dynamoelectric machine exciting winding for further controlling the frequency and speed thereof, means for electrically connecting said first-mentioned alternating current dynamoelectric machine alternating current winding to said second alternating current dynamoelectric machine alternating current winding for transmitting electrical power therebetween, a third alternating current dynamoelectric machine having a winding, means for connecting said third dynamoelectric machine winding to a source of electrical power, means for controlling the speed of said third dynamoelectric machine, and means for transmitting mechanical power between said second dynamoelectric machine and said third dynamoelectric machine including a controllable speed connection therebetween.

6. A variable speed electric system including a variable frequency and speed alternating current dynamoelectric machine having an alternating current winding, means for changing the number of poles of said alternating current dynamoelectric machine winding for controlling the frequency and speed thereof, means for transmitting power between a source of mechanical power and said alternating current dynamoelectric machine, a second variable frequency and speed alternating current dynamoelectric machine having an alternating current winding and a direct current exciting winding, means for changing the number of poles of said second alternating current dynamoelectric machine alternating current winding for controlling the frequency and speed thereof, means for changing the number of poles of said second alternating current dynamoelectric machine exciting winding for further controlling the frequency and speed thereof, means for electrically connecting said first-mentioned alternating current dynamoelectric machine alternating current winding to said second alternating current dynamoelectric machine alternating current winding for transmitting electrical power therebetween, a third dynamoelectric machine having a winding, means for connecting said third dynamoelectric machine to a source of electrical power, means for controlling the speed of said third dynamoelectric machine, and means for transmitting mechanical power between said second dynamoelectric machine and said third dynamoelectric machine.

7. A variable speed electric system for testing a source of mechanical power including an alternating current dynamoelectric machine having an alternating current winding, means for transmitting power between said source of mechanical power and said alternating current dynamoelectric machine, a second alternating current dynamoelectric machine having an alternating current winding, means for changing the number of poles of said second alternating current dynamoelectric machine for controlling the frequency and speed thereof, means for electrically connecting said first-mentioned alternating current dynamoelectric machine alternating current winding to said second alternating current dynamoelectric machine alternating current winding for transmitting electrical power therebetween, a third alternating current dynamoelectric machine having a winding, means for connecting said third dynamoelectric machine winding to a source of electrical power, means for controlling the speed of said third dynamoelectric machine, and means for transmitting mechanical power between said second dynamoelectric machine and said third dynamoelectric machine including a controllable speed and voltage direct current dynamoelectric machine electrically connected to a second controllable speed and voltage direct current dynamoelectric machine with means for mechanically connecting said second direct current dynamoelectric machine to said third alternating current dynamoelectric machine.

8. A variable speed electric system for testing a source of mechanical power including an alternating current dynamoelectric machine having an alternating current winding, means for transmitting power between said source of mechanical power and said alternating current dynamoelectric machine, a second alternating current dynamoelectric machine having an alternating current winding and a direct current exciting winding, means for changing the number of poles of said second alternating current dynamoelectric machine alternating current winding for controlling the frequency and speed theerof, means for changing the number of poles of said second alternating current dynamoelectric machine exciting winding for further controlling the frequency and speed thereof, means for electrically connecting said first-mentioned alternating current dynamoelectric machine alternating current winding to said second alternating current dynamoelectric machine alternating current winding for transmitting electrical power therebetween, a third alternating current dynamoelectric machine, means for connecting said third dynamoelectric machine to a source of electrical power, means for controlling the speed of said third dynamoelectric machine, and means for transmitting mechanical power between said second dynamoelectric machine and said third dynamoelectric machine including a controllable speed and voltage direct current dynamoelectric machine electrically connected to a second controllable speed and voltage direct current dynamoelectric machine with means for mechanically connecting said second direct current dynamoelectric machine to said third alternating current dynamoelectric machine.

9. A variable speed electric system for testing a source of mechanical power including a variable frequency and speed alternating current dynamoelectric machine having a multipolar alternating current winding, means for changing the number of poles of said alternating current dynamoelectric machine winding for controlling the frequency and speed thereof, means including an induction type slip coupling for transmitting power between said source of mechanical power and said alternating current dynamoelectric machine, a second variable frequency and speed alternating current dynamoelectric machine having an alternating current winding and a direct current exciting winding, means for changing the number of poles of said second alternating current dynamoelectric machine alternating current winding for controlling the frequency and speed thereof, means for changing the number of poles of said second alternating current dynamoelectric machine exciting winding for further controlling the frequency and speed thereof, means for electrically connecting said first-mentioned alternating current dynamoelectric machine alternating current winding to said second alternating current dynamoelectric machine alternating current winding for transmitting electrical power therebetween, a third alternating current dynamoelectric machine having a winding, means for connecting said third dynamoelectric machine winding to a source of electrical power, means for controlling the speed of said third dynamoelectric machine, and means for transmitting mechanical power between said second dynamoelectric machine and said third dynamoelectric machine.

GEORGE E. CASSIDY.

REFERENCES CITED

The following references are of record in the file of this patent:

UNITED STATES PATENTS

| Number | Name | Date |
| --- | --- | --- |
| 1,499,542 | MacMillan | July 1, 1924 |
| 1,723,857 | Hobart | Aug. 6, 1929 |
| 1,861,750 | Mitzlaff | June 7, 1932 |
| 1,892,295 | Walker | Dec. 27, 1932 |
| 2,189,353 | Steinbauer et al. | Feb. 6, 1940 |

Certificate of Correction

Patent No. 2,440,076.                                         April 20, 1948.

GEORGE E. CASSIDY

It is hereby certified that errors appear in the printed specification of the above numbered patent requiring correction as follows: Column 4, line 74, after the word "said" insert *second*; column 6, line 32, for "betwen" read *between*; and that the said Letters Patent should be read with these corrections therein that the same may conform to the record of the case in the Patent Office.

Signed and sealed this 17th day of August, A. D. 1948.

[SEAL]

THOMAS F. MURPHY,
*Assistant Commissioner of Patents.*